(12) United States Patent
Nagashima et al.

(10) Patent No.: US 10,495,160 B2
(45) Date of Patent: Dec. 3, 2019

(54) DISC BRAKE AND METHOD OF PRODUCING THE DISC BRAKE

(71) Applicant: HITACHI AUTOMOTIVE SYSTEMS, LTD., Ibaraki (JP)

(72) Inventors: Shiro Nagashima, Kai (JP); Toru Tamaru, Kai (JP); Shinji Suzuki, Minami Arupusu (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 44 days.

(21) Appl. No.: 15/738,039

(22) PCT Filed: Jun. 16, 2016

(86) PCT No.: PCT/JP2016/067905
§ 371 (c)(1),
(2) Date: Dec. 19, 2017

(87) PCT Pub. No.: WO2017/006733
PCT Pub. Date: Jan. 12, 2017

(65) Prior Publication Data
US 2018/0306255 A1 Oct. 25, 2018

(30) Foreign Application Priority Data
Jul. 3, 2015 (JP) ................................. 2015-134498

(51) Int. Cl.
*F16D 55/00* (2006.01)
*F16D 55/227* (2006.01)
*B22C 9/22* (2006.01)
(Continued)

(52) U.S. Cl.
CPC .............. *F16D 55/227* (2013.01); *B22C 9/22* (2013.01); *F16D 55/2265* (2013.01);
(Continued)

(58) Field of Classification Search
CPC .. F16D 65/095; F16D 65/097; F16D 65/0972; F16D 65/0056; F16D 65/0062;
(Continued)

(56) References Cited

U.S. PATENT DOCUMENTS 5,564,532 A * 10/1996 Baba .................... F16D 55/226
188/205 A
9,422,992 B2 * 8/2016 Bach .................. F16D 65/0972
(Continued)

FOREIGN PATENT DOCUMENTS

| JP | 2011-218931 | 11/2011 |
|---|---|---|
| JP | 2012-092968 | 5/2012 |
| JP | 2014-214830 | 11/2014 |

OTHER PUBLICATIONS

International Search Report dated Aug. 2, 2016 in International Application No. PCT/JP2016/067905.

*Primary Examiner* — Nicholas J Lane
(74) *Attorney, Agent, or Firm* — Wenderoth, Lind & Ponack, L.L.P.

(57) ABSTRACT

Provided is a disc brake which solves, with a simple structure, the issue of interference between a carrier and an electric motor. A carder 3 applied to the disc brake includes a recess 28 in one arm 18 of the pair of arms 18 and 19 which recess is casted so as to be recessed in a direction toward a line, which is parallel to a tangent line L3 tangent to an the pin hole boss 16 on one side and perpendicular to a line segment L1 connecting centers of the pair of pin holes (pin hole bosses 16, 16) and extends through the center of the pin hole on the one side, with respect to the tangent line L3. This makes it possible to prevent or reduce the interference between the carrier 3 and the electric motor, with a simple structure.

1 Claim, 10 Drawing Sheets

(51) Int. Cl.
*F16D 65/02* (2006.01)
*F16D 65/18* (2006.01)
*F16D 55/2265* (2006.01)
*F16D 65/00* (2006.01)
*F16D 65/095* (2006.01)

(52) U.S. Cl.
CPC ..... *F16D 65/0056* (2013.01); *F16D 65/0068* (2013.01); *F16D 65/02* (2013.01); *F16D 65/095* (2013.01); *F16D 65/18* (2013.01); *F16D 55/22655* (2013.01); *F16D 2055/0008* (2013.01); *F16D 2055/0016* (2013.01); *F16D 2250/0007* (2013.01); *F16D 2250/0084* (2013.01)

(58) Field of Classification Search
CPC .... F16D 55/224; F16D 55/226; F16D 55/227; F16D 2055/0008; F16D 2250/0007
USPC .................................................. 164/245, 248
See application file for complete search history.

(56) References Cited

U.S. PATENT DOCUMENTS

| | | | |
|---|---|---|---|
| 2004/0060781 A1* | 4/2004 | Goebel | B22C 9/22 188/73.31 |
| 2007/0170019 A1* | 7/2007 | Rockwell | F16D 65/0972 188/73.38 |
| 2011/0120821 A1* | 5/2011 | Shimamura | F16D 65/0972 188/234 |
| 2012/0067678 A1* | 3/2012 | Andrews | F16D 55/227 188/206 A |
| 2013/0025981 A1* | 1/2013 | Maehara | F16D 55/227 188/72.3 |
| 2014/0151165 A1* | 6/2014 | Zenzen | B23P 15/18 188/73.31 |
| 2015/0107944 A1* | 4/2015 | Mallmann | F16D 65/0972 188/73.38 |
| 2018/0045259 A1* | 2/2018 | Schmandt | F16D 65/0056 |

* cited by examiner (a)

(b)

DISC BRAKE AND METHOD OF PRODUCING THE DISC BRAKE

TECHNICAL FIELD

The invention relates to a disc brake and a method of producing the disc brake.

BACKGROUND ART

There have been disc brakes with electric parking brake mechanisms. Such a disc brake includes an, electric motor for driving a piston (see Patent Literature 1).

CITATION LIST

Patent Literature

PTL 1: Japanese Unexamined Patent Application Publication No. 2014-214830

SUMMARY OF INVENTION

Technical Problem

When an electric motor is installed in a disc brake with an electric parking brake mechanism, there is the issue of interference between a distal end of a motor-gear unit (hereinafter, referred to as an MGU) and a carrier. If the system is intended to be created while avoiding such interference, there will be another issue, that is, complication of the structure.

An object of the invention is to provide a disc brake and a method of producing the disc brake, which solve the issue of interference between the carrier and the electric motor by a simple structure.

Solution to Problem

A disc brake according to one embodiment of the invention includes a pair of pads disposed, across a rotor, respectively on both sides of the rotor in an axial direction of the rotor, and a carrier configured to support the pair of pads. The carrier includes a beam attached to a non-rotating portion of a vehicle, a pair of arms extending, from respective ends of the beam in a radial direction of the rotor, a pair of pin inserting portions extending from the pair of arms across the rotor, a pair of pin holes formed in respective ends of the pin inserting portions along the axial direction of the rotor, and pin hole bosses formed around the pin holes. The carrier has a recess which is formed in one of the pair of arms to be located in an opposite face to the rotor and open toward the other of the pair of arms.

According to a disc brake producing method of one embodiment of the invention, the carrier is formed by a pair of casting molds in the inside of which a product cavity corresponding to the carrier is created so that a line segment extending perpendicular to a line segment connecting centers of the pair of pin holes is inclined relative to a mold opening/closing direction.

The one embodiment of the invention provides a disc brake and a method of producing the disc brake, which solve the issue of interference between the carrier and the electric motor by a simple structure.

DESCRIPTION OF EMBODIMENTS

A disc brake 1 of the present embodiment will be explained below in details with reference to FIGS. 1 to 12. In the following explanation, a side on which a wheel is located with respect to a disc rotor 2 will be referred to as an outer side, whereas an opposite side to the wheel with respect to the disc rotor 2, on which a center of a vehicle in a transverse direction is located, will be referred to as an inner side. The explanation will be provided on a further premise that an axial direction of a rotary shaft of the disc rotor 2 is referred to as a disc axial direction, that a radial direction of the disc rotor 2 is referred to as a disc radial direction, and that a rotating direction of the disc rotor 2 is referred to as a disc rotating direction.

Figure 1:
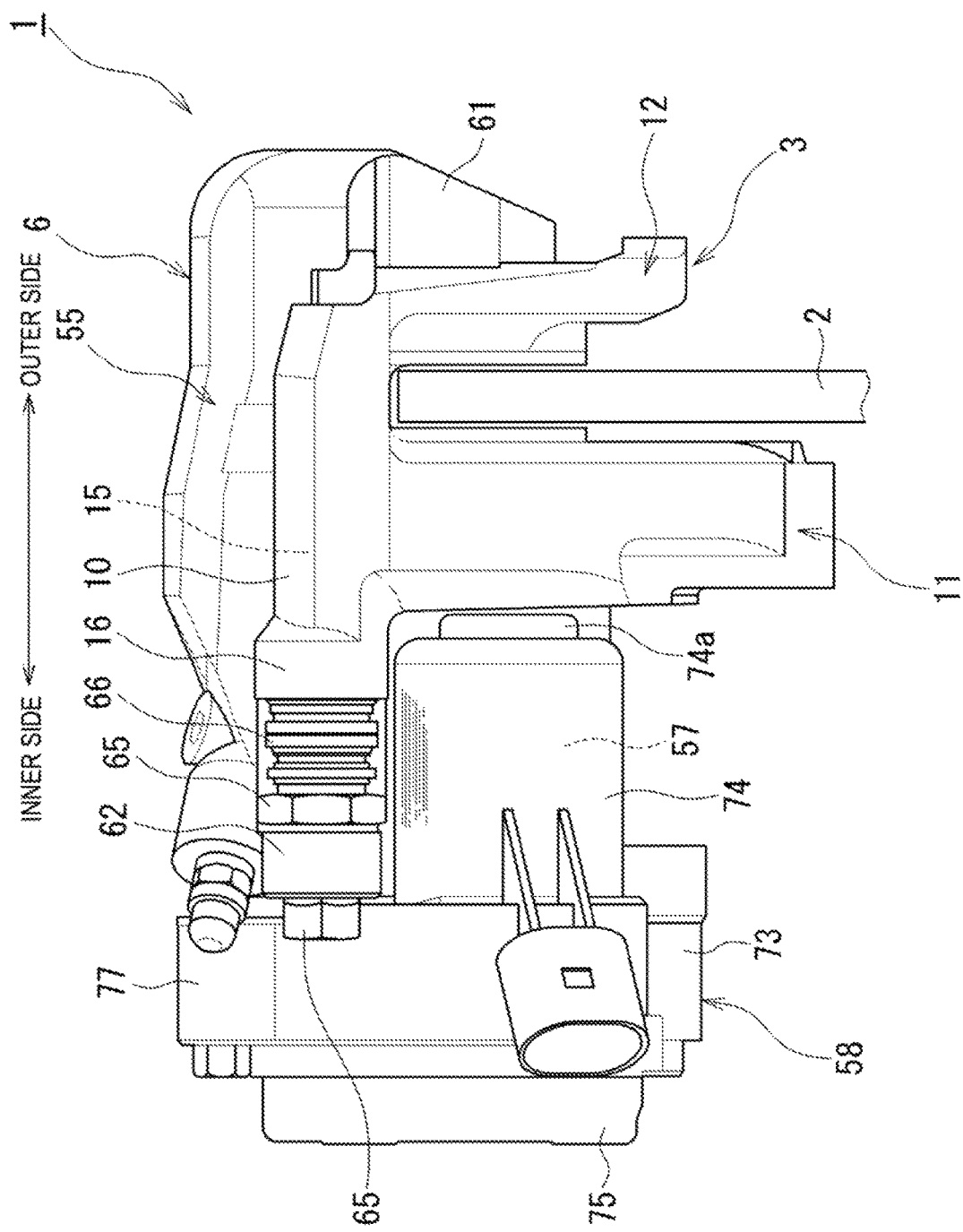
FIG. 1 is an external view of a disc brake as viewed in, a longitudinal direction of a vehicle.
Figure 2:
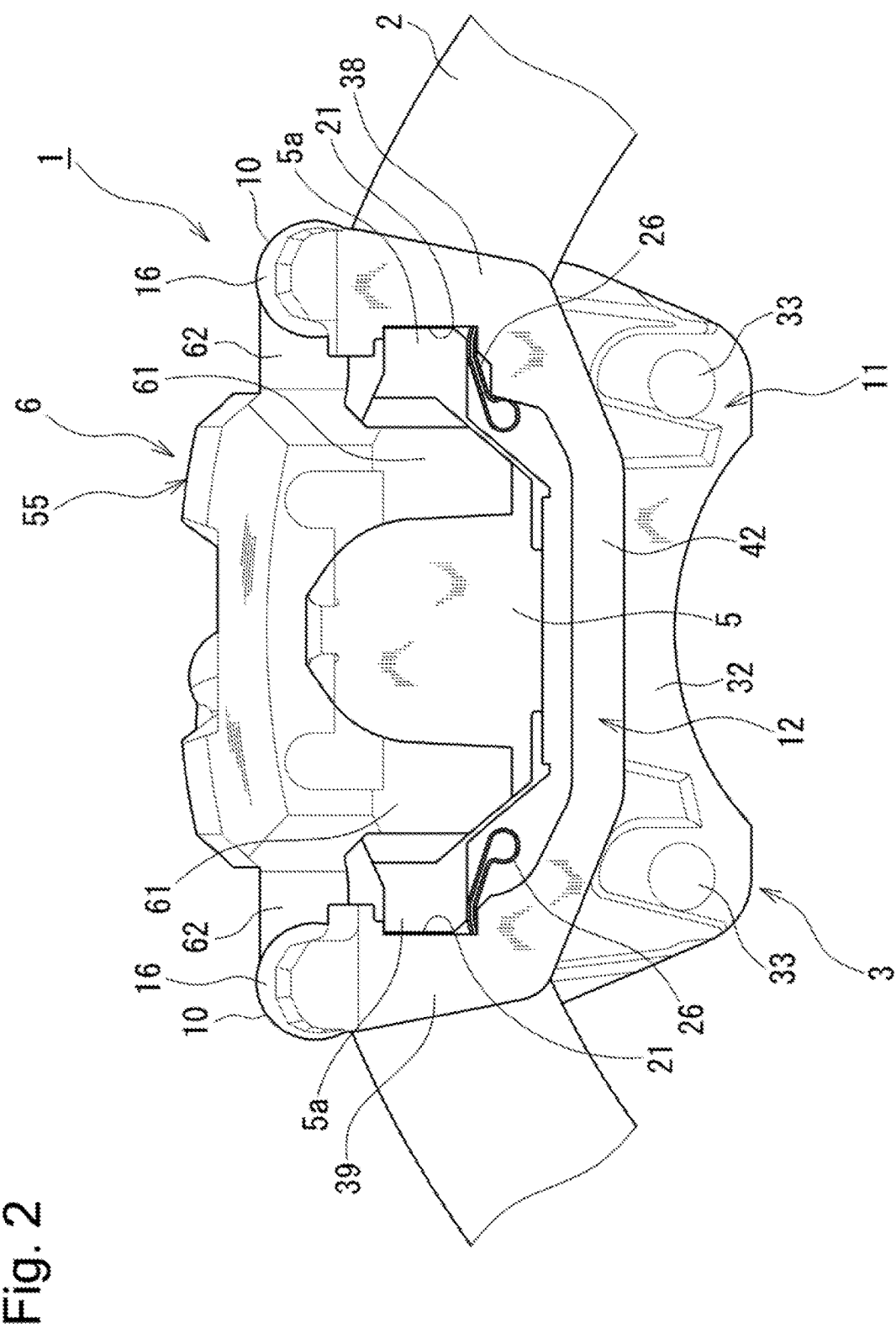
FIG. 2 is an external view of the disc brake as viewed from the outside (outer side) of the vehicle.
Figure 3:
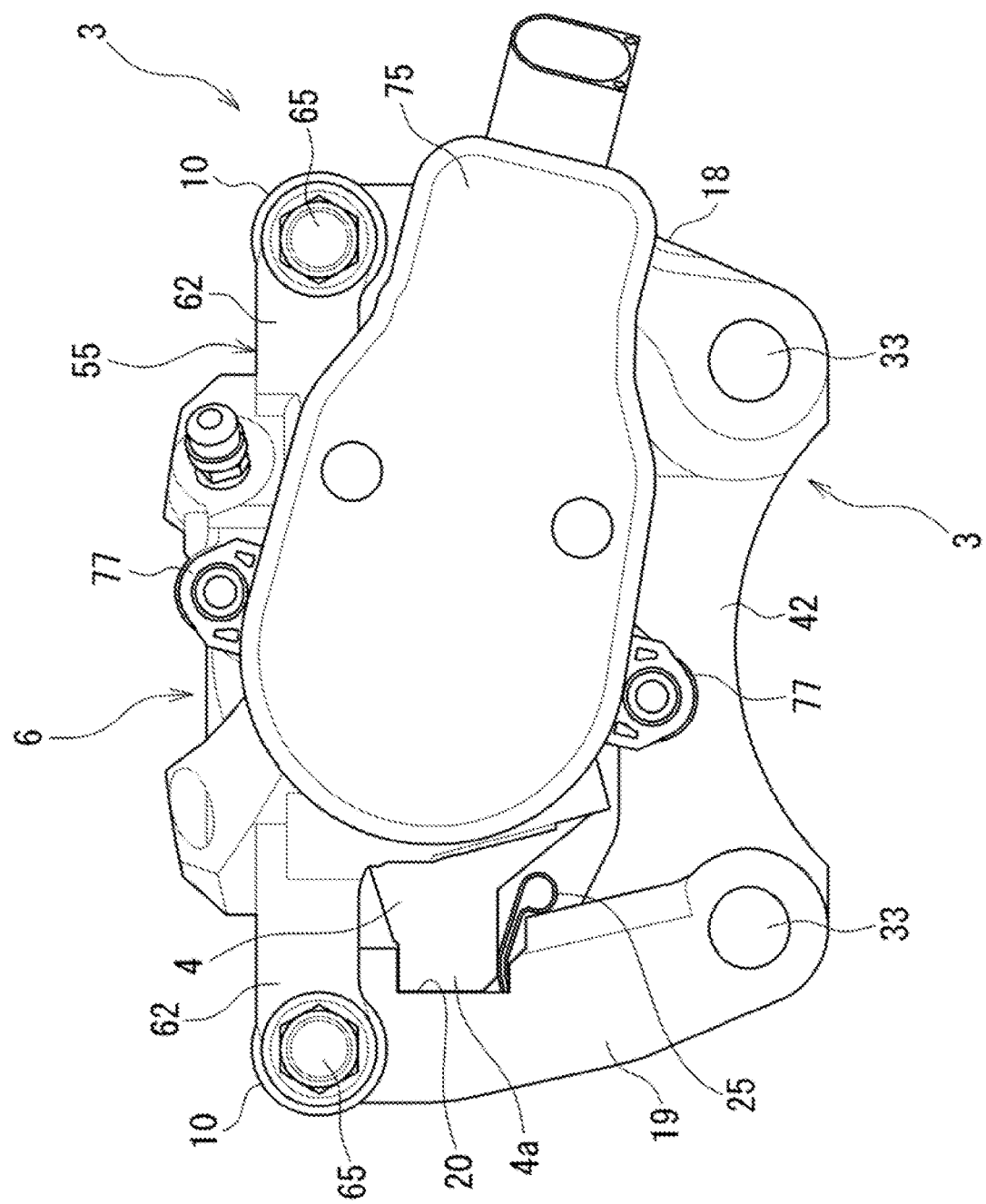
FIG. 3 is an external view of the disc brake as viewed from the inside (inner side) of the vehicle.

As shown in FIGS. 1 to 3, the disc brake 1 is a caliper floating disc brake. The disc brake 1 includes the disc rotor 2 configured to rotate with a wheel, a carrier 3 fixed to a non-rotating portion (not shown) on a vehicle body side, a pair of inner and outer pads 4 and 5 disposed in respective sides of the disc rotor 2 and supported by the carrier 3, and a caliper 6 disposed across the disc rotor 2 and supported by a pair of slide pins 15, 15 so as to be movable relative to the carrier 3 along an axial direction of the disc rotor 2.

Figure 4:
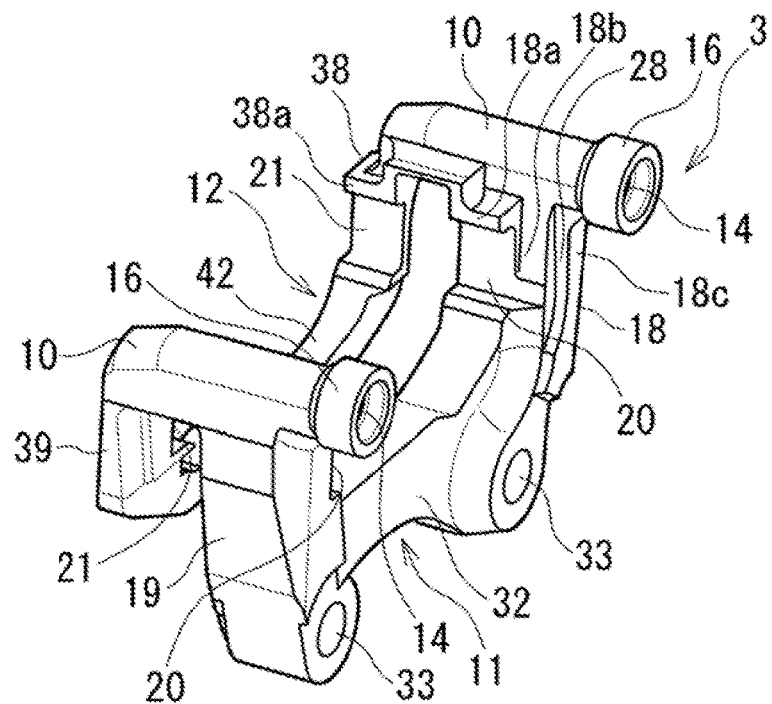
FIG. 4 is a perspective view of a carrier in a product shape.
Figure 5:
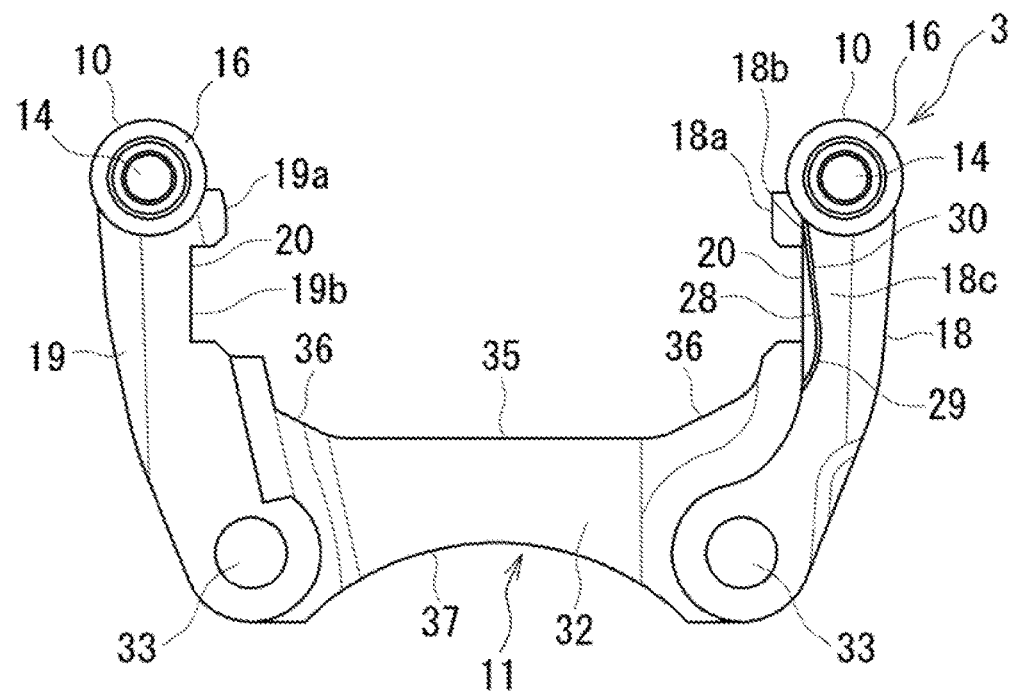
FIG. 5 is a view of the carrier in the product shape as viewed from the inside of the vehicle.
Figure 6:
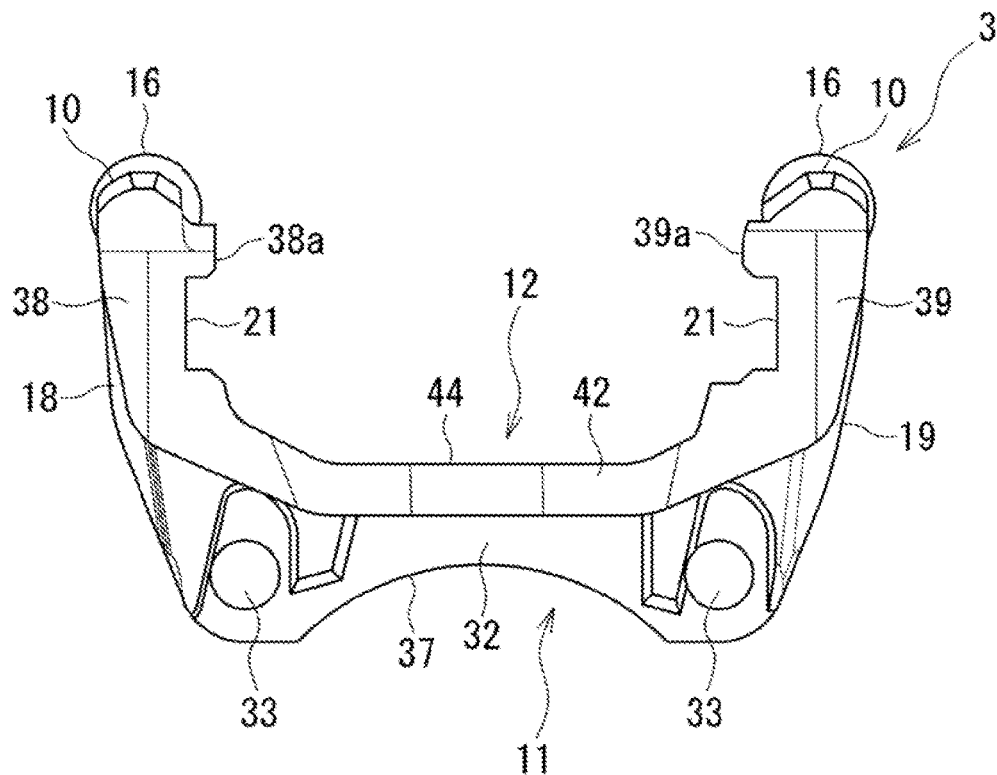
FIG. 6 is a view of the carrier in the product shape as viewed from the outside of the vehicle.
Figure 8:
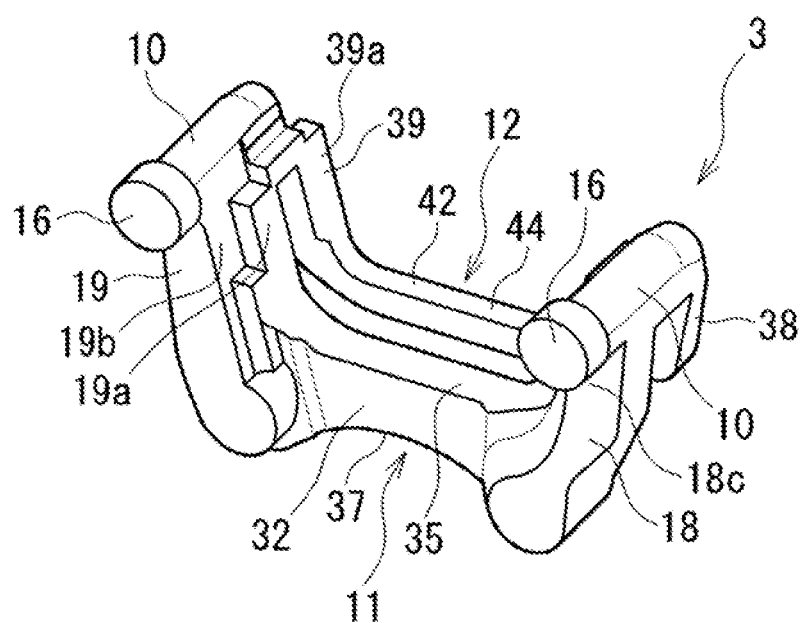
FIG. 8 is a perspective view of the carrier which has been casted.
Figure 9:
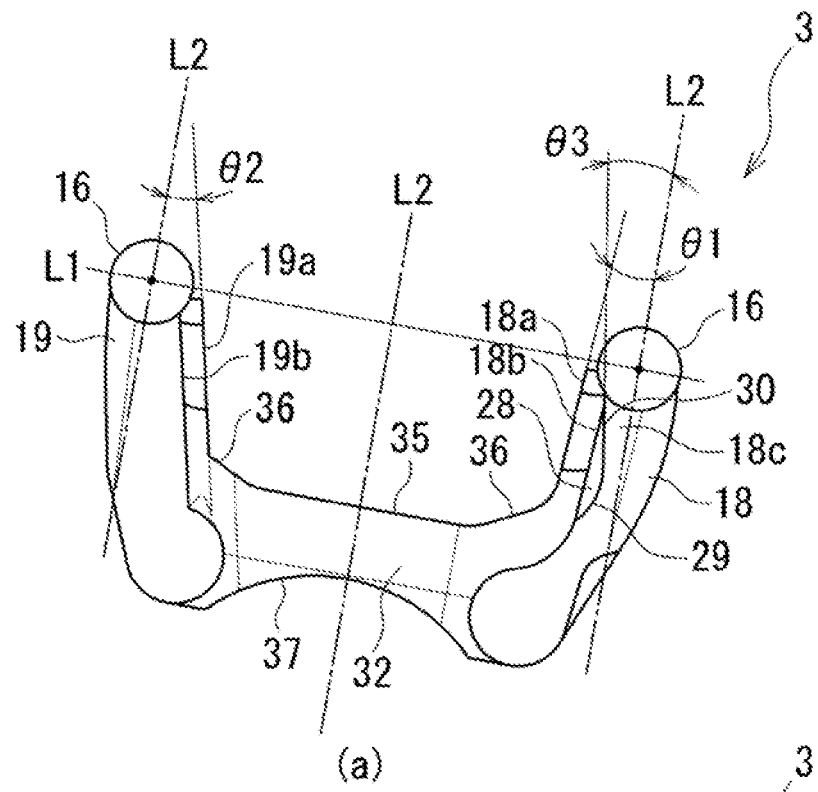
FIGS. 9(a) and 9(b) both show the casted carrier as viewed from the inside of the vehicle.
Figure 9:
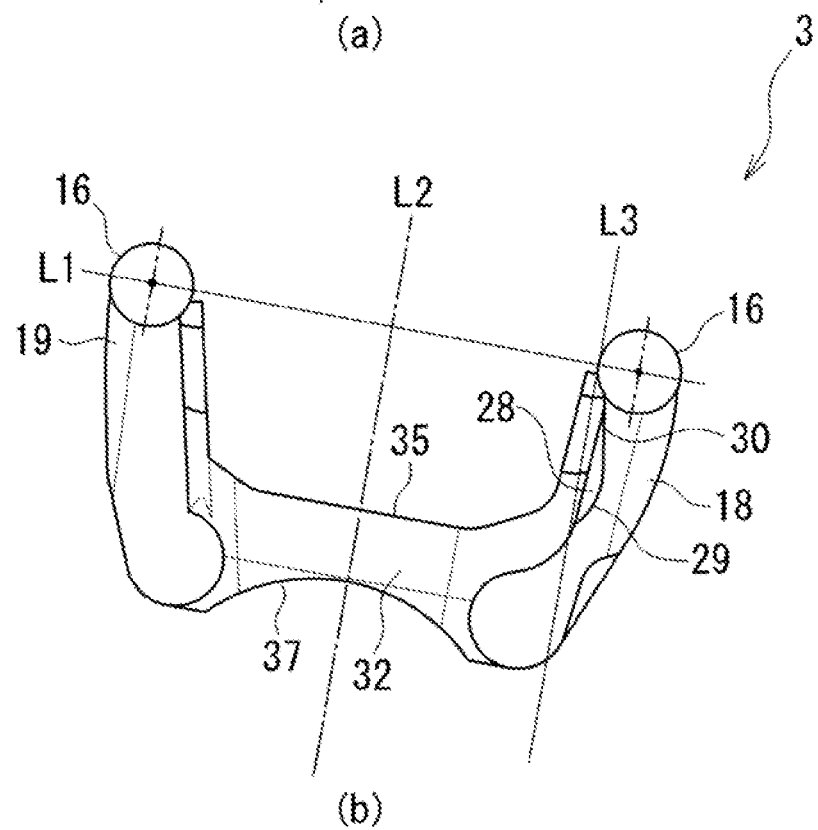
Figure 10:
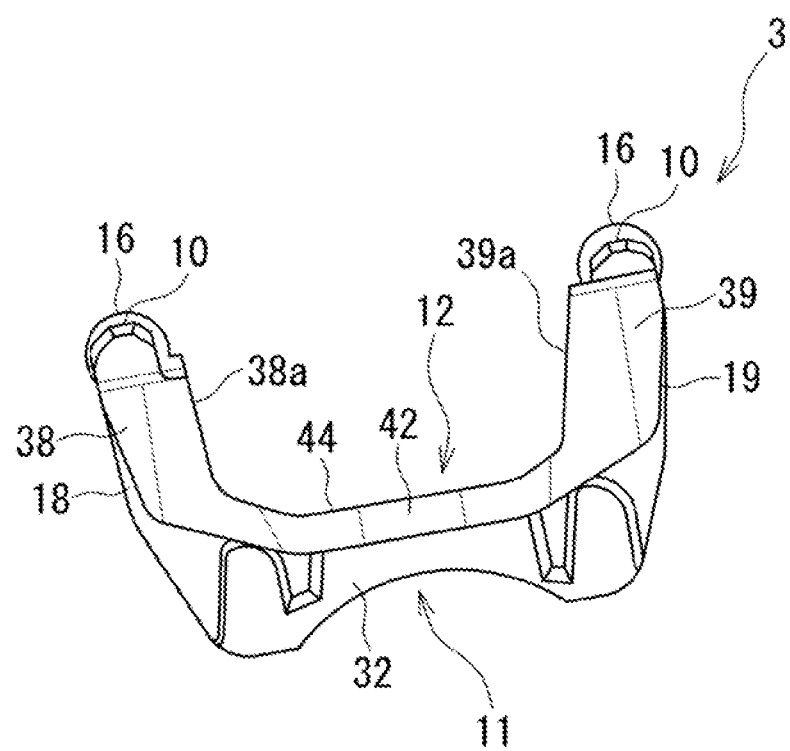
FIG. 10 shows the casted carrier as viewed from the outside of the vehicle.
Figure 11:
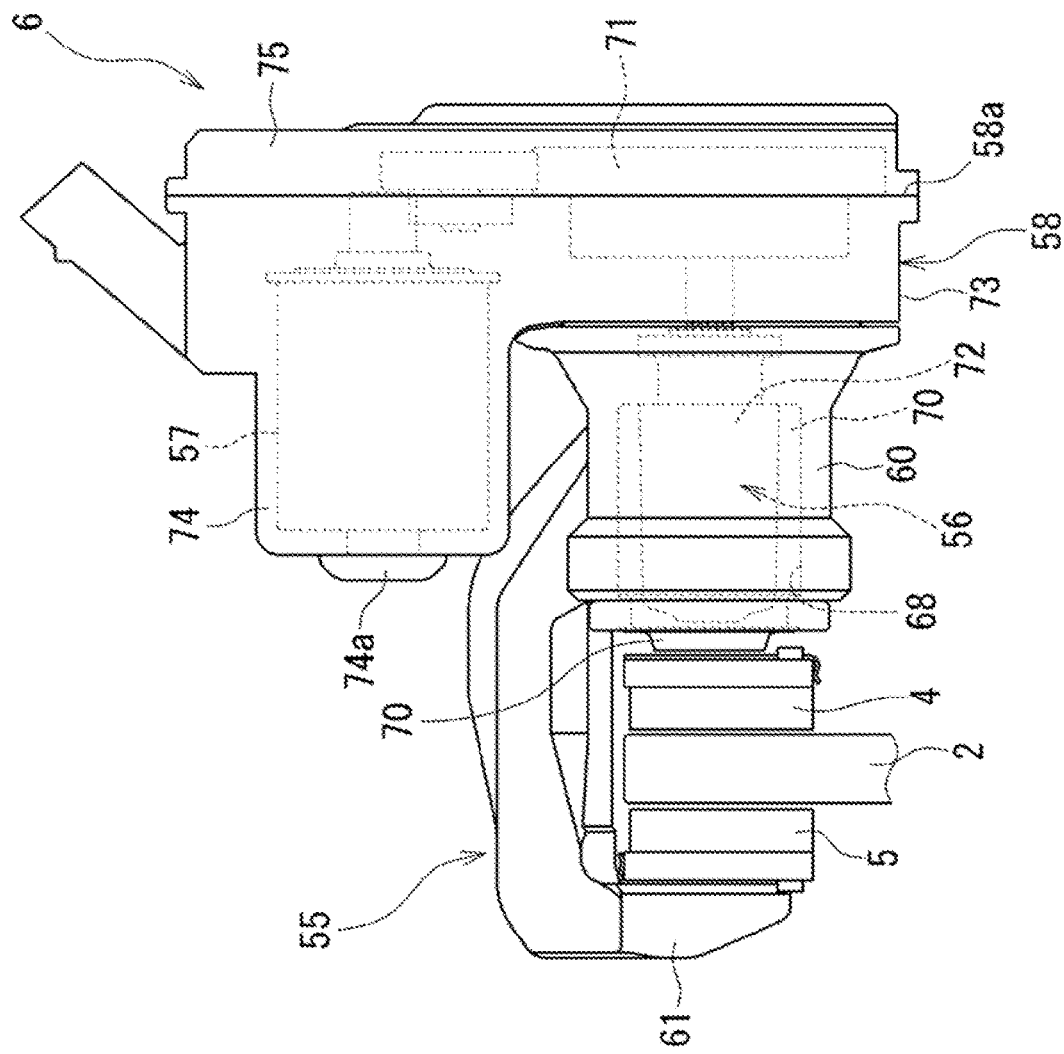
FIG. 11 is a view for explaining a caliper.

The carrier 3 will be described below in details. FIGS. 4 to 6 show a final shape of the carrier 3. FIGS. 8 to 10 show a shape of the carrier 3 which has been casted.

As shown in FIGS. 4 to 6 (see also FIGS. 1 to 3, if necessary), the carrier 3 includes a pair of pin inserting portions 10, 10 through which the pair of slide pins 15, 15 are inserted, and inner-side and outer-side support portions 11 and 12 integrally coupled to the pair of pin inserting portions 10, 10 and independently supporting the inner and outer pads 4 and 5, respectively. The pair of pin inserting portions 10, 10 are arranged along the disc rotating direction with a space left therebetween and extend in the disc axial direction. The pin inserting portion 10 is formed in a shape oft bottomed cylinder having a pin hole 14 through which the slide pin 15 is inserted. The pin hole 14 of the pin inserting portion 10 has an opening side facing the inner side and a bottom side facing the outer side. A cylindrical pin hole boss 16 is formed around the pin, bole 14 at an inner-side end of the pin inserting portion 10. The pin hole boss 16 has an external diameter which is larger than an external diameter of the pin inserting portion 10. The outer-side support portion 12 is integrally coupled to an outer side of the pin inserting portion 10. The inner-side support portion 11 is coupled to the pin inserting portion 10 with a space left between the inner-side and out support portions 11 and 12 along the disc axial direction.

The inner-side support, portion 11 includes a pair of inner arms 18 and 19 having one ends coupled to the pin inserting portions 10, 10, and an inner beam 32 which couples the other ends of the pair of inner arms 18 and 19. The inner arms 18 and 19 receive a braking torque which is transmitted from the inner pad 4 when a brake is applied to the vehicle moving forward or backward.

As shown in FIGS. 8 and 9, the one inner arm 18 is provided with first and second opposing faces 18a and 18b which are opposed to the other inner arm 19. The first opposing face 18a and the second opposing face 18b are formed to have a stepped shape (see FIG. 4). The second opposing face 18b is formed in a position retracting from the first opposing face 18a to the pin inserting portion 10 side in the disc rotating direction, the position being closer to the inner side than the first opposing face 18a in the disc axial direction, and yet located in an area close to the pin inserting portion 10 in the disc radial direction. The first opposing face 18a and the second opposing face 18b extend, generally parallel to each other. In a similar manner, the other inner arm 19 is provided with first and second opposing faces 19a and 19b which are opposed to the one inner arm 118 (see FIG. 8). The first opposing face 19a and the second opposing face 19b are formed to have a stepped shape. The second opposing face 19b is formed in a position retracting from the first opposing face 19a to the pin inserting portion 10 side in the disc rotating direction, the position being closer to the inner side than the first opposing face 19a in the disc axial direction, and yet located in an area close to the pin inserting portion 10 in the disc radial direction. The first opposing face 19a and the second opposing face 19b extend generally parallel to each other.

As shown in FIG. 9, the first and second opposing faces 18a and 18b of the one inner arm 1 and the first and second opposing faces 19a and 19b of the other inner arm 19 extend from joining sections which join the inner arm 18 and the inner arm 19 to the inner beam 32, with an inclination relative to a line segment L2 extending in a generally perpendicular direction to a line segment L1 connecting centers of the pair of pin hole bosses 16, 16 (pin holes 14, 14) (hereinafter, referred to as a line segment L2) in such a manner that distance from the first and second opposing faces 18a and 18b to the first and second opposing faces 19a and 19b increases by degrees (like the shape of a letter V). An inclination angle θ1 of the first and second opposing faces 18a and 18b of the one inner arm 18 relative to the line segment L2 is set smaller than an inclination angle θ2 of the first and second opposing faces 19a and 19b of the other inner arm 19 relative to the line segment L2.

The first opposing faces 18a and 19a of the inner arms 18 and 19 are provided with support recesses 20, 20 extending in the disc axial direction. Each of the support recesses 20, 20 is formed to have a U-shaped cross section. As shown in FIG. 3, the inner pad 4 includes engaging portions 4a, 4a protruding from respective side portions of the inner pad 4. The engaging portions 4a, 4a are engaged with the support recesses 20, 20 of the inner-side support portion 11, and the inner pad 4 is accordingly supported to be movable toward and away from the disc rotor 2. Springs 25, 25 are fixed into the support recesses 20, 20 of the inner arms 18 and 19 along inner wall surfaces of the support recesses 20, 20. The springs 25, 25 are disposed between the respective engaging portions 4a, 4a of the inner pad 4 and the respective support recesses 20, 20 of the inner arms 18 and 19. The springs 25, 25 bias the engaging portions 4a of the inner pad 4 to the pin inserting portions 10 side in a radially outward direction of the disc rotor 2 within the support recesses 20.

As shown in FIGS. 4, 5 and 9, a recess 28 is formed to extend from the second opposing face 18b of the one inner arm 18 to an inner-side inner face 18c opposed to an end of an electric motor 57 (described later). The recess 28 is provided for avoidance of interference with a small-diameter projection 74a (described later) of a second housing portion 74 (described later) which houses the electric motor 57. The recess 28 is formed by making a depression along the disc axial direction and the disc rotating direction. The recess 28 is casted so as to be recessed in a direction toward a line parallel to a tangent line L3 and extending through the center of the pin hole 14 (pin hole boss 16) (opposite side to L2) from the tangent line L3. The tangent line L3 is parallel to the line segment L2 and tangent to the one of the pin hole bosses 16. More specifically, the recess 28, when viewed from the inner side, has a shape including an arc-like portion 29 in an arc-like shape and a rectilinear portion 30 which tangentially extends from the arc-like portion 29 toward the second opposing face 18b of the one inner arm 18. The arc-like portion 29 is formed on the inner beam 12 side. The rectilinear portion 30 is inclined at a predetermined inclination angle θ3 relative to the line segment L2. The inclination angle θ2 of the first and second opposing faces 19a and 19b eat the other inner arm 19 relative to the line segment L2 is set larger than the inclination angle θ3 relative to the line segment L2 of the rectilinear portion 30. The inclination angles θ2 and θ3 may be approximately the same.

As shown in FIGS. 4 and 5, through-holes 33, 33 are formed in respective ends of the inner beam 32 in order to attach the carrier 3 to the non-rotating portion of the vehicle. The through-holes 33, 33 pierce through the ends of the inner beam 32 along the disc axial direction. The inner beam 32 is so formed as to increase in width along the direction of the line segment L2 (disc radial direction) by degrees from a middle portion of the inner beam 32 toward the ends thereof. The inner beam 32 is formed so that the width is largest at portions around the through-holes 33. In other words, the inner beam 32 has one face on the pin inserting portion 10 side, in which there is formed a flat face 35 in a longitudinal middle of the one face and includes inclined faces 36, 36 extending from ends of the flat surface 35 toward the first and second opposing faces 18a, 18b, 19a and 19b of the inner arms 18 and 19. The other face of the inner beam 32 is formed into a recessed arc-like face 37. The other face of the inner beam 32 has largest width at portions around the through-holes 33. A disc axial thickness of the inner beam 32 around the through-holes 33 is approximately the same as a disc axial thickness of the inner arms 18 and 19. A region between the through-holes 33, 33 of the inner beam. 32 has a disc axial thickness which is, smaller than the disc axial thickness of the inner arms 18 and 19.

As shown in FIGS. 4, 6, 8 and 10 (see also FIGS. 1 to 3, if necessary), the outer-side support portion 12 includes a pair of outer arms 38 and 39 having one ends coupled to the pin inserting portions 10, 10, and an outer beam 42 which couples the other ends of the pair of outer arms 38 and 39. The outer arms 38 and 39 has opposing faces 38a and 39a which continue from the second opposing faces 18b and 19b of the inner arms 18 and 19 of the inner-side support portion 11. Accordingly, the opposing face 38a of the one outer arm 38 and the opposing face 39a of the other outer arm 39 extend with an inclination relative to the line segment L2 so that distance between the opposing face 38a and the opposing face 39a gradually increases from mining sections which join the outer arm 38 and the outer arm 39 to the outer beam 42 (like the shape of a letter V). The inclination angle θ1 (see FIG. 9) of the opposing face 38a of the one outer arm 38 relative to the line segment L2 is set smaller than the inclination angle θ2 (see FIG. 9) of the opposing face 38b of the other outer arm 39 relative to the line segment L2. The outer arms 38 and 39 receive a braking torque which is transmitted from the outer brake pad 5 when the brake is applied to the vehicle moving forward or backward.

The opposing faces 38a and 39a of the outer arms 38 and 39 are provided with support recesses 21, 21 extending in the disc axial direction. Each of the support recesses 21, 21 is formed to have a U-shaped cross section. As shown in FIG. 2, the outer pad 5 has engaging portions 5a, 5a protruding from respective side portions of the outer pad 5. The engaging portions 5a, 5a are engaged with the support recesses 21, 21 formed in the opposing faces 38a and 39a of the outer arms 38 and 39, and the outer pad 5 is thus supported to be movable to toward and away from the disc rotor 2. Springs 26, 26 are, fixed into the support recesses 21, 21 of the outer arms 38 and 39 along inner wall surfaces of the support recesses 21, 21. The springs 26, 26 are disposed between the respective engaging portions 5a, 5a of the outer pad 5 and the respective support recesses 21, 21 of the outer arms 38 and 39. The springs 26, 26 bias the engaging portions 5a of the outer pad 5 to the pin inserting portions 10 side in a radially outward direction of the disc rotor 2 within the support recesses 21.

As shown in FIGS. 4, 6, 8 and 10, the outer beam 42 is formed in a shape which is convex toward the center of the disc rotor 2. The outer arms 38 and 39 are approximately the same as the outer beam 42 in overall disc axial thickness. The outer beam 42 is formed smaller than the inner beam 32 in length along the line segment L2 (disc radial direction). The outer beam 42 includes a face on the pin inserting portion 10 side, which is formed into a flat aloe 44. The flat face 44 of the outer beam 42 and the flat face 35 of the inner beam 32 are located in the same plane.

The inner-side support portion 11 is formed larger than the outer-side support portion 12 in overall disc axial thickness.

The disc brake with an electric brake parking brake mechanism has the issue that the coupling of the electric motor 57 (described later) to the caliper 6, for example, narrows an interspace or creates interference between an end of an MGU (motor-gear unit) and the inner-side support portion 11 of the carrier 3. One conceivable solution for the issue is to incline the MGU itself to prevent the MGU from interfering with the carrier 3. However, this requires the MGU to be made with special specifications and results in high costs.

Another conceivable solution is to provide the carrier 3 with a relief for avoiding interference with the electric motor 57. However, to make the relief by post-process machining incurs high costs. If the relief is undercut to be integrally formed by utilizing a core, an insert or another similar tool to a casting structure, this also leads to high costs due to the complicated casting structure.

Figure 7:
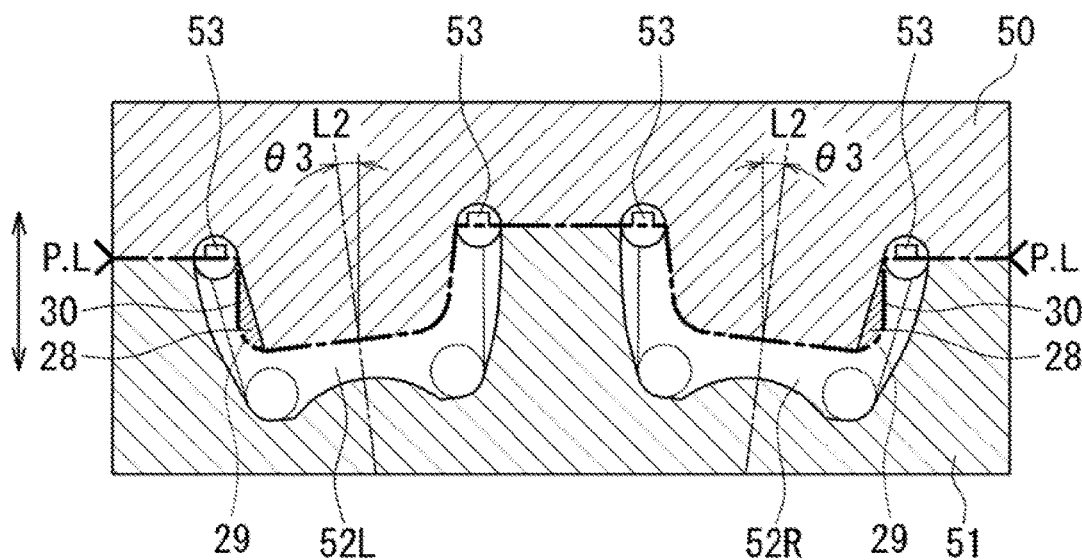
FIG. 7 is a sectional view of a pair of casting molds in the inside of which a product cavity corresponding to the carrier is formed.

In light of the above facts, the present embodiment employs a method in which the carrier 3 with the relief is integrally formed by casting without using an undercutting structure in which a core, an insert or another similar tool is utilized. The carrier 3 is therefore first integrally formed by a casting device into a shape illustrated in FIGS. 8 to 10. As schematically shown in FIG. 7, the casting device used includes a pair of casting structures 50 and 51, instead of including the undercutting structure including a core, an insert (slide core or the like) or another similar tool. For easy understanding, FIG. 7 exaggerates the recess 28 (shaded portions) of the present embodiment, "P, L" is a parting line.

As shown in FIG. 7, formed between the pair of casting molds 50 and 51 are product cavities 52R and 52L respectively corresponding to the right-side carrier 3 and the left-side carrier 3. The product cavities 52R and 52L corresponding to the carrier are formed in such a manner that the line segments L2 of the product cavities 52R and 52L are inclined at the inclination angle θ3 relative to a mold opening/closing direction of the pair of casting molds 50 and 51 so that the mold opening/closing direction (direction of an arrow) of the pair of casting molds 50 and 51 is the same as an extending direction of the rectilinear portion 30 formed in the recess 28 of the carrier 3. In other words, the right-side product cavity 52R is formed so that the line segment L2 thereof is inclined rightward on the drawing at the inclination angle θ3 relative to the mold opening/closing direction of the pair of casting molds 50 and 51. The left-side product cavity 52L is formed so that the line segment L2 thereof is inclined leftward on the drawing at the inclination angle θ3 relative to the mold opening/closing direction of the pair of casting molds 50 and 51. The product cavities 52R and 52L have molten inlets 53 for leading molten metal into cavities. The molten inlets 53 are located in positions corresponding to the pin inserting portions 10 of the carrier 3.

After mold closing takes place, molten metal is poured from the molten inlets 51, 53 to fill the product cavities 52R and 52L. After the molten metal solidifies with in the product 52R and 52L, the pair of casting molds 50 and 51 are opened. At the time of mold opening, the pair of casting molds 50 and 51 can be released without difficulty. This is because there is no undercut portion made in the recess 28 which is formed in the one inner are 18 since the inclination angle θ2 of the first and second opposing faces 19a and 19b of the other inner arm 19 relative to the line segment L2 is set larger than the inclination angle θ3 or the rectilinear portion 30 of the recess 28 relative to the line segment L2, and the mold opening/closing direction and the extending direction of the rectilinear portion 30 of the recess 28 and made to be the same as each other. In this manner, the carrier 3 including the recess 28 is casted as shown in FIG. 9.

The pin holes 14 of the pin inserting portions 10 and the through-holes 22, 33 formed in the ends of the inner beam 32 of the inner-side support portion 11 are next formed by machining. The support recesses 20 and 21 of the inner and outer arms 18, 19 and 38, 39 of the inner-side and outer-side support portions 11 and 12 are also formed by machining. In this manner, the carrier 3 is formed into a final shape shown in FIGS. 4 and 6. The support recess 20 and 21 of the inner and outer arms 18, 19 and 38, 39 require accuracy in dimensions and therefore are subjected to machining.

The caliper 6 will be explained below with reference to FIGS. 1 to 3 and 11.

The caliper 6 is integrally constructed with a caliper main body 55, a piston unit 56, the electric motor 57 juxtaposed with the caliper main body 55, and a housing 58 which houses the piston unit 56 and the electric motor 57.

Formed integrally with the caliper main body 55 are a cylindrical cylinder portion 60 which opens to face one side of the disc rotor 2, a claw 61 extending toward the opposite side across the disc rotor 2 from the cylinder portion 60, and a pair of caliper arms 62, 62 outwardly extending from the cylinder portion 60. The slide pins 15, 15 are fastened to the pair of caliper arms 62, 62 by means of fastening nuts 65, 65. The slide pins 15, 15 are inserted in the pin holes 14 of the pin inserting portions 10 of the carrier 3 to be slidable in the axial direction. Rubber pin boots 66, 66 are disposed between respective one ends of the slide pins 15, 15 and the respective pin inserting portions 10, 10 of the carrier 3. The pin boots 66, 66 include extensible bellows portions covering the slide pins 15, 15. The cylinder portion 60 is provided with a guide bore 68 in which a piston 70 of the piston unit 56 is slidably fitted.

The piston unit 56 includes the piston 70 having a bottomed cylinder-like shape, a deceleration mechanism 71 disposed inside the housing 58 and configured to increase torque from the electric motor 57, and a rotation-linear motion conversion mechanism 72 housed inside the piston 70 and configured to convert a rotational motion from the deceleration mechanism 71 into a linear motion, provide thrust to the piston 70, and retain the piston 70 in a braking position. The piston 70 is slidably fitted in the guide bore 68 of the caliper main body 55 (cylinder portion 60). The inner pad 4 is held by the inner-side support portion 11 of the carrier 3 in a position opposed to a bottom of the piston 70.

The housing 58 includes a first housing portion 73 which houses the deceleration mechanism 71, and the second housing portion 74 which integrally protrudes from the first housing portion 73 toward the carrier 3 along the axial direction to have a shape like a bottomed cylinder and houses the electric motor 37, so as to cover an outer periphery of the cylinder portion 60. The housing 58 has an opening 58a in one end thereof. The opening 58a is airtightly closed by a cover 75. The second housing portion 74 has a small-diameter projection 74a which is protrudingly formed in an axial one end face of the second housing portion 74. A distal end of the second housing portion 74 is directed to between the inner face 18c and the second, opposing face 18b of the one inner arm 18 of the inner-side support portion 11 included in the carrier 3. The housing 58 is fastened to the cylinder portion 60 of the caliper main body 55 through a fastening portion 77 which is formed to outwardly protrude from an outer periphery of the first housing portion 73.

Figure 12:
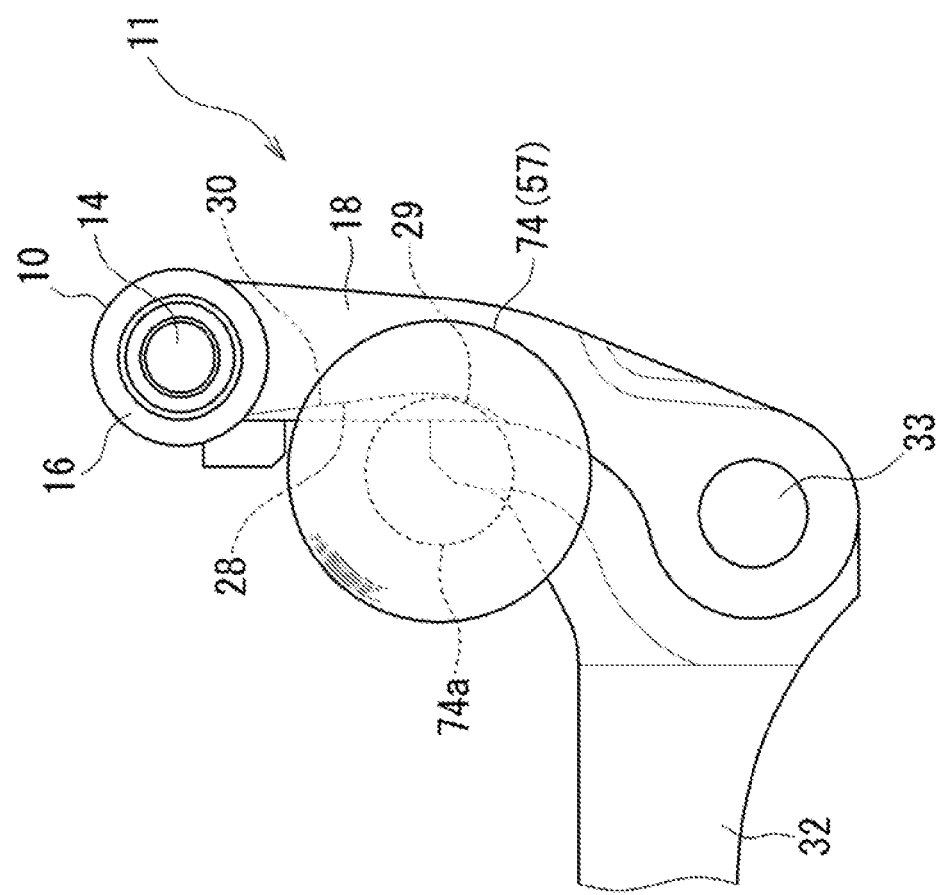
FIG. 12 shows positional relationship between a recess formed in one inner arm of the carrier and a second housing portion which houses an electric motor.

The first housing portion 73 of the housing 58 is fixed to the cylinder portion 60 of the caliper main body 55 through the fastening portion 77, to thereby construct a caliper 67. The slide pins 15, 15 are fastened to the pair of caliper arms 62, 62 provided to the caliper main body 55 of the caliper 67 by means of the fastening nuts 65, 65. The slide pins 15, 15 are inserted in the pin holes 14, 14 of the pin inserting portions 10, 10 of the carrier 3 to be slidable in the axial direction. The carrier 3 is fixed to the non-rotating portion located on the vehicle body side, through the through-holes 33, 33 of the inner-side support portion 11. The second housing portion 74 which houses the electric motor 57 is therefore disposed along the disc axial direction, and the small-diameter projection 74a of the second housing is disposed in vicinity to the inner-side inner face 18c of the one inner arm 18c of the inner-side support portion 11 of the carrier 3 as shown in FIGS. 1 and 12. However, the recess 28 extending from the second opposing face 18b to the inner face 18c of the one inner arm 18 can prevent or reduce the interference of the small-diameter projection 74a of the second housing 58 with the one inner arm 18 of the inner-side support portion 11.

Operation of the disc brake 1 of the present embodiment will now be explained below.

Discussed first will be the operation of the disc brake 1 during a braking action, as an ordinary hydraulic brake by operating a brake pedal (not shown).

When the brake pedal is pressed by a driver, hydraulic pressure corresponding, to pressing force on the brake pedal is supplied from a master cylinder through a hydraulic circuit (both not shown) into a hydraulic chamber located inside the cylinder portion 60 of the caliper main body 55. This moves the piston 70 forward (leftward in FIG. 11) from an original position in which the piston 70 is located when braking is not applied, while elastically deforming a piston seal. (not shown) to presses the inner pad 4 against the disc rotor 2. The caliper main body 55 is then moved rightward in FIG. 11 relative to the carrier 3 by a reaction force to pressing three of the piston 70 to press the outer pad 5 attached to the claw 61, against the disc rotor 2. The disc rotor 2 is accordingly sandwiched by the pair of inner and outer pads 4 and 5, so that a friction force and thus a braking force of the vehicle are generated.

When the driver releases the brake pedal afterwards, the hydraulic pressure supply from the master cylinder is stopped, which lowers the hydraulic pressure within the hydraulic chamber. The piston 70 therefore retracts to the original position due to a restoring force of elastic deformation of the piston seal, to thereby release the braking force.

With application of a parking brake which is an example of operation for maintaining a halt condition of the vehicle, the electric motor 57 is activated, and the torque of the electric motor 57 is transmitted through the deceleration mechanism 71 of the piston unit 56 to the rotation-linear motion conversion mechanism 72. The torque is then converted into a linear motion of the piston 70. The piston 70 then moves forward to cause the inner and outer pads 4 and 5 to sandwich the disc rotor 2, which generates the braking force. The rotation-linear motion conversion mechanism 72 maintains the braking position of the piston 70. This maintains the braking force and completes the operation of the parking brake.

To release the parking brake afterwards, the electric motor 57 is rotationally driven in a release direction which moves the piston 70 away from the disc rotor 2. The deceleration mechanism 71 is accordingly rotationally driven in the release direction which, returns the piston 70. The piston 70 then retracts to the original position due to the restoring force of elastic deformation of the piston seal, to thereby completely release the braking force.

As already explained, the carrier 3 applied to the disc brake 1 of the present embodiment includes the one inner arm 18 in which the recess 28 for avoiding the interference with the small-diameter projection 74a (electric motor 57) is formed to extend from the second opposing face 18b opposed to the other inner arm 19 to the inner-side inner face 18c opposed to the small-diameter projection 74a of the second housing portion 74 which houses the electric motor 57. The recess 28, when viewed from the inner side, has the shape including the arc-like portion 29 and the rectilinear portion 30 which tangentially extends from the arc-like portion 29 toward the second opposing face 18b. The rectilinear portion 30 extends with the inclination angle θ3 relative to the line segment L2. The inclination angle θ2 of the first, and second opposing faces 19a and 19b of the other inner arm 19 relative to the line segment L2 is set larger than the inclination angle θ3 of the rectilinear portion 30.

Such a shape of the carrier 3 enables the carrier 3 to be made by means of the pair of casting molds 50 and 51 which do not include any undercutting structure. To be more specific, when the product cavity 52R (52L) which corresponds to the carrier is formed within the pair of casting molds 50 and 51, the product cavity 52R (52L) is formed to incline at the inclination angle θ3 relative to the mold opening/closing direction so that the mold opening/closing direction is the same as the extending direction of the rectilinear portion 30 of the recess 28 formed in the inner-side support portion 11.

Since an undercut portion is not made in, a region of the recess 28 formed in the inner-side support portion 11 (one inner arm 18) of the carrier 3 to prevent the interference with the electric motor 57, the recess 28 can be integrally formed by the pair of casting molds 50 and 51 without the undercutting structure.

According to the disc brake 1 of the present embodiment, the recess 28 is formed to extend from the second opposing face 18b of the one inner arm 1 of the carrier 3 to the inner-side inner face 18c. The recess 28, when, viewed from the inner side, has the shape including the arc-like portion 29 and the rectilinear portion 30 which tangentially extends from the arc-like portion 29 toward the second opposing face 18b. The shape of the recess 28 viewed from the inner side may be a shape like an arc which is centered at a position inwardly away from the second opposing face 18b. In such an embodiment, the formation can be performed with the line segment L2 inclined relative to the mold opening/closing direction of the pair of casting molds 50 and 51 at such an inclination angle that does not make any undercut portion in the recess 28.

Disc brakes based on the above discussed embodiments are, for example, those of the following aspects.

In a first aspect, a disc brake includes a pair of pads disposed, across a rotor, respectively on both sides of the rotor in an axial direction of the rotor, and a carrier configured to support the pair of pads. The carrier includes a beam attached to a non-rotating portion of a vehicle, a pair of arms extending from respective ends of the beam in a radial direction of, the rotor, a pair of pin inserting portions extending from the pair of arms across the rotor, a pair of pin holes formed in respective ends of the pin inserting portions along the rotor axial direction, and pin hole bosses formed around the pin holes. A recess is formed in one of the pair of arms to be located in an opposite face to a disc and open toward the other of the pair of arms.

In a second aspect according to the first aspect, the recess is casted in one of the pair of arms so as to be recessed in a direction toward a line, which is parallel to a line perpendicular to a line segment connecting centers of the pair of pin holes and tangent to an edge on the other side of the pin hole boss on the one side and extends through the center of the pin hole on the one side, with respect to the line.

In a third aspect according to either one of the first and second aspects, the disc brake includes a pair of arms on the other side, which are disposed on, an opposite side to the center of the carrier along a rotor axial direction with respect to the pair of arms. Distance between the pair of arms and the pair of arms on the other side increases with increasing distance from the beam.

In a fourth aspect according to the second aspect according to any one of the first tea third aspects, the carrier is formed by a pair of casting molds which do not include an undercutting structure.

In a fifth aspect according to the second aspect according to any one of the first to fourth aspects, the recess is formed in the arm on the one side to be located from an opposing face facing the arm on the other side to an inner-side inner face.

In a sixth aspect, provided is a method producing a disc brake including a pair of pads disposed, across a rotor, respectively on both sides of the rotor in an axial direction of the rotor, and a carrier configured to support the pair of pads. The carrier includes a beam attached to a non-rotating portion of a vehicle, a pair alarms extending from respective ends of the beam in a radial direction of the rotor, pin inserting portions extending from the pair of arms across the rotor, a pair of, pin holes drilled in respective ends of the pin, inserting portions along a rotor axial direction, pin hole bosses formed around the pin holes, and a recess in a direction toward a line, which is parallel to a line perpendicular to a line segment connecting centers of the pair of pin holes and tangent to an edge on the other side of the pin hole boss on the one side and extends through the center of the pin hole on the one side, with respect to the line. The carrier is formed by a pair of casting molds in the inside of which a product cavity corresponding to the carrier is formed so that a line segment perpendicular to the line segment connecting the centers of the pair of pin holes is inclined relative to a mold opening/closing direction.

The foregoing description explains only a few embodiments of the invention. One skilled in the art should easily understand that the exemplary embodiments may be modified or improved in various ways without substantially departing from the novel teachings and advantages of the invention. Accordingly, all such modifications and improvement are intended to be included within the technical scope of the invention. The embodiments may be combined in any ways.

The present application claims priority to Japanese Patent Application No. 2015-134498 filed on Jul. 3, 2015. The entire disclosure of Japanese Patent Application No. 2015-134498 filed on Jul. 3, 2015, including the description, the claims, the drawings and the abstract, is incorporated herein by reference in its entirety.

REFERENCE SIGNS LIST 1 disc brake; 2 disc rotor; 3 carrier; 4 inner pad; 5 outer pad; 10 pin inserting portion; 11 inner-side support portion; 14 pin hole; 16 pin hole boss; 18 one inner arm; 18b second opposing face; 18c inner face; 28 recess; 29 arc-like portion; 30 rectilinear portion; 32 inner beam; 50, 51 casting mold; 52R, 52L product cavity

The invention claimed is:
1. A method of producing a disc brake including:
a pair of pads disposed, across a rotor, respectively on both sides of the rotor in an axial direction of the rotor; and
a carrier configured to support the pair of pads,
the carrier including:
an inner beam attached to a non-rotating portion of a vehicle;
a pair of inner arms extending from respective ends of the inner beam in a radial direction of the rotor;
pin inserting portions extending from the pair of inner arms across the rotor;
a pair of pin holes drilled in respective ends of the pin inserting portions along the rotor axial direction;
pin hole bosses formed around the pin holes; and
a recess formed on the one inner arm so as to be dented in a direction toward a line L2, which is parallel to a tangent line L3,
the tangent line L3 being perpendicular to a line segment L1 connecting centers of the pair of pin holes and being tangent to an edge, on a side of the pin hole boss, of one of the pin holes at one side of the carrier, the line L2 extending through the center of the one side pin hole, with respect to the tangent line L3, wherein the method comprises forming the carrier by a pair of casting molds defining an interior product cavity corresponding to the carrier, the carrier being formed so that a line segment perpendicular to the line segment connecting the centers of the pair of pin holes is inclined relative to a mold opening/closing direction.

* * * * *